(No Model.)
G. H. ZIEGLER.
BEARING.
No. 447,598. Patented Mar. 3, 1891.
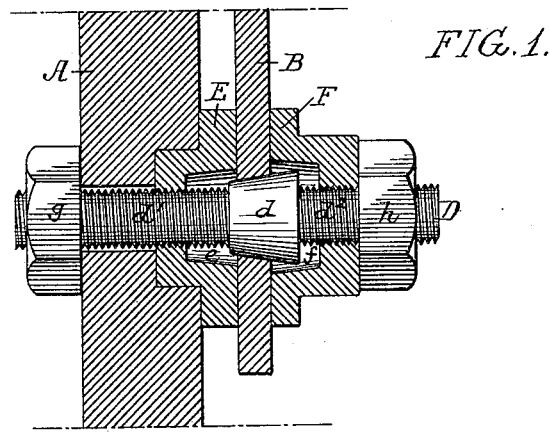
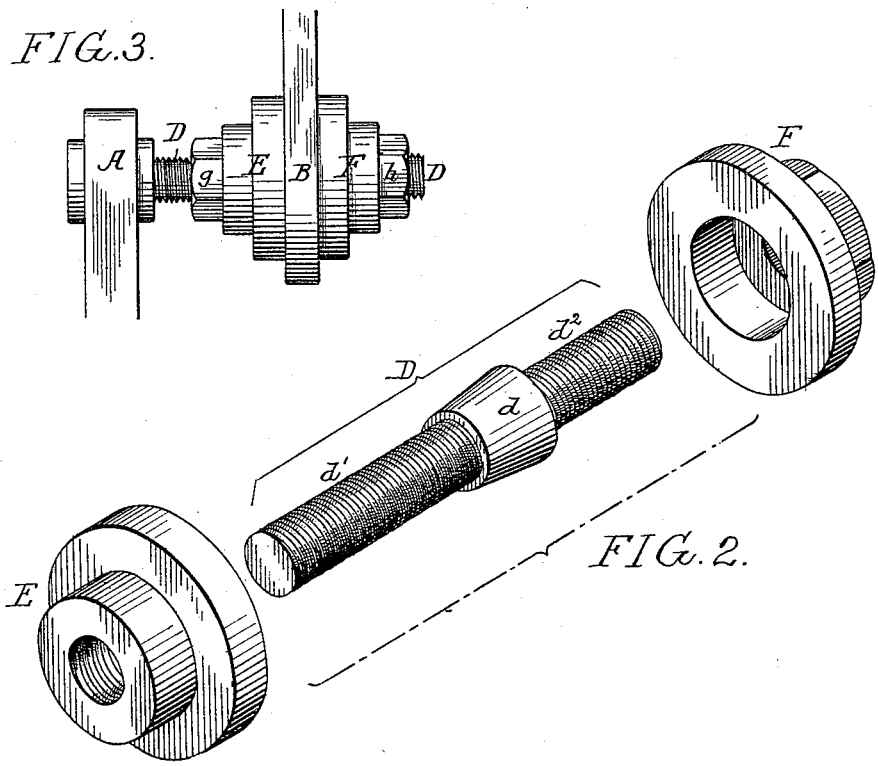
Witnesses:
R. Schleicher.
A. V. Groupe.
Inventor
George H. Ziegler
by his Attorneys
Howson & Howson

UNITED STATES PATENT OFFICE.

GEORGE H. ZIEGLER, OF PHILADELPHIA, PENNSYLVANIA, ASSIGNOR TO THE MacKELLAR, SMITHS & JORDAN COMPANY, OF SAME PLACE.

BEARING.

SPECIFICATION forming part of Letters Patent No. 447,598, dated March 3, 1891.

Application filed December 30, 1890. Serial No. 376,237. (No model.)

*To all whom it may concern:*

Be it known that I, GEORGE H. ZIEGLER, a citizen of the United States, and a resident of Philadelphia, Pennsylvania, have invented certain Improvements in Bearings, of which the following is a specification.

The object of my invention is to construct a take-up bearing to be used especially as the fulcrum of a lever, so that the wear of the parts can be readily taken up without disturbing the alignment of the lever with parts of machinery in connection with which it is operated.

Referring to the drawings, Figure 1 is a sectional view of my improved bearing. Fig. 2 is a perspective view of the parts detached, and Fig. 3 is a view of a modification.

A is the fixed frame, and B is the lever or other arm which is fulcrumed on the spindle D. The spindle has a central tapered portion $d$ and screw-threaded portions $d'$ $d^2$ on each side of the tapered portion. The lever B has a tapered orifice through which is passed the spindle D, the tapered portion of the spindle snugly fitting the orifice. The lever vibrates between two face-nuts E and F, the nut E being screwed upon the portion $d'$ of the spindle, while the nut F is screwed upon the portion $d^2$ of the spindle. Cavities $e$ and $f$ are formed in each of the nuts E and F to allow for the free movement, when necessary, of the tapered portion $d$ of the spindle. Jam-nuts $g$ and $h$ are screwed onto their respective portions of the spindle, firmly holding the nuts E and F and preventing their moving with the lever D. I make the portion $d'$ of the spindle of sufficient length to pass through an orifice in the standard or frame A. A portion of the nut E is also inserted in the said frame, and, as shown in Fig. 1, the jam-nut $g$ is on the opposite side of the frame to that of the nut E, thus firmly securing the spindle to the frame, although the nut $g$ may be arranged in close contact with the face-nut E and the stem $d'$ of the spindle D secured to the frame in any suitable manner, as shown in Fig. 3.

If, for instance, the lever has to bear at all times a certain relation to its frame, or non-adjustable mechanism thereon, and lost motion owing to wear occurred at the fulcrum, the jam-nut $h$ would be unscrewed, likewise the nut F, and the nut E would be forced farther upon the spindle, until the lost motion between the spindle and the lever would be taken up, owing to the increased diameter of the tapered portion $d$. The jam-nut $g$ would be then tightened, and the nuts F and $h$ would be moved toward the lever until a snug fit was assured. It will thus be seen that the lost motion can be readily taken up without changing the alignment of the lever.

My invention is especially applicable to machines where delicate adjustments are essential, such as type-casting machines, where accuracy is an absolute necessity.

I claim as my invention—

1. The combination of the spindle provided with a tapered portion and screw-threaded portions at each side of the tapered portion, a lever adapted to said tapered portion, and nuts on each side of the lever and adapted to said screw-threaded portion, substantially as described.

2. The combination of the frame, a spindle provided with a tapered portion and with screw-threaded portions on each side of the tapered portion, a lever having an orifice adapted to said tapered portion, nuts adapted to the screw-threaded portion of the spindle and bearing against each side of the lever, said spindle passing through the frame, and a jam-nut on the spindle, said frame being confined between the jam-nut and one of the adjusting-nuts substantially, as described.

In testimony whereof I have signed my name to this specification in the presence of two subscribing witnesses.

GEO. H. ZIEGLER.

Witnesses:
EUGENE ELTERICH,
JNO. E. PARKER.